(12) United States Patent
Ikeda et al.

(10) Patent No.: US 7,008,573 B2
(45) Date of Patent: Mar. 7, 2006

(54) AMORPHOUS COKE FOR SPECIAL CARBON MATERIAL AND PRODUCTION PROCESS FOR THE SAME

(75) Inventors: Taisa Ikeda, Kitakyushu (JP); Tetsusei Fukuda, Kitakyushu (JP); Yoichi Kawano, Kitakyushu (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/416,768

(22) PCT Filed: Oct. 26, 2001

(86) PCT No.: PCT/JP01/09440

§ 371 (c)(1),
(2), (4) Date: Oct. 2, 2003

(87) PCT Pub. No.: WO02/40616

PCT Pub. Date: May 23, 2002

(65) Prior Publication Data

US 2004/0131857 A1    Jul. 8, 2004

(30) Foreign Application Priority Data

Nov. 16, 2000   (JP) .............................. 2000-349779

(51) Int. Cl.
   *C04B 35/00* (2006.01)
   *C10B 57/00* (2006.01)
(52) U.S. Cl. .................. 264/29.5; 44/591; 264/434
(58) Field of Classification Search ................ 428/408; 264/434, 29.5; 44/591
   See application file for complete search history.

(56) References Cited

U.S. PATENT DOCUMENTS 4,535,382 A * 8/1985 Wada et al. ................ 252/572
4,982,027 A * 1/1991 Korff et al. ............ 423/DIG. 18
6,719,956 B1 * 4/2004 Gaur et al. .............. 423/445 R

FOREIGN PATENT DOCUMENTS

| JP | 60-3118 | 1/1985 |
|----|---------|--------|
| JP | 02-069308 | 3/1990 |
| JP | 3-43493 | 2/1991 |
| JP | 3-237063 | 10/1991 |
| JP | 4-283293 | 10/1992 |
| JP | 4-311794 | 11/1992 |
| JP | 5-105881 | 4/1993 |
| JP | 6-80970 | 3/1994 |
| JP | 6-228565 | 8/1994 |
| JP | 7-216361 | 8/1995 |
| JP | 11-181445 | 7/1999 |
| JP | 2000-53970 | 2/2000 |

OTHER PUBLICATIONS

English abstract of SU 1781283 published in Dec. 15, 1992.*

* cited by examiner

*Primary Examiner*—Archene Turner
(74) *Attorney, Agent, or Firm*—Darby & Darby

(57) ABSTRACT

Provided are an amorphous coke for a special carbon material characterized in that it is an amorphous coke obtained by blending a coal tar base heavy oil and/or a petroleum base heavy oil with a resin and subjecting the mixture to thermal decomposition polycondensation; it has a larger thermal expansion coefficient than that of a coke obtained from a heavy oil alone; and a molded article of the coke is shrunk by 0.3% or more in terms of a volume change rate before and after the treatment when it is subjected to graphitizing treatment, and a production process of an amorphous coke for a special carbon material characterized in that in subjecting a coal tar base heavy oil or a petroleum base heavy oil to thermal decomposition polycondensation, the raw material is blended with a resin to modify a coke crystal structure.

1 Claim, No Drawings

AMORPHOUS COKE FOR SPECIAL CARBON MATERIAL AND PRODUCTION PROCESS FOR THE SAME

This is a U.S. national phase application under 35 U.S.C. §371 of International Patent Application No. PCT/JP01/09440 filed Oct. 26, 2001, and claims the benefit of Japanese Patent Application No. 2000-349779, filed Nov. 16, 2000. The International Application was published in Japanese on May 23, 2002 as WO 02/40616 A1 under PCT Article 21(2).

TECHNICAL FIELD

The present invention relates to an amorphous coke for a special carbon material and a production process for the same, specifically to an amorphous coke for a special carbon material which allows a molded article obtained from the above coke to cause volume shrinkage before and after graphitizing treatment by controlling a thermal expansion coefficient so that the thermal expansion coefficient grows larger than usual to provide a graphite molded article having a high density and high strength and a production process for the same.

BACKGROUND ART

A calcined coke produced in a delayed coking plant is used for an aggregate of an artificial graphite electrode for electric steel manufacturing, an aggregate of an electrode for aluminum refining and an aggregate for a special carbon material, and in addition thereto, it is used for a recarburizer and fuel. On the other hand, cracked distillate is used for gasoline, a base raw material for chemical products, fuel and black oil.

In general, artificial graphite for an artificial graphite electrode for electric steel manufacturing and a special carbon material is produced by crushing a calcined coke produced in a delayed coking plant, adjusting the crushed to a certain particle size distribution and baking it after blending with binder pitch and molding, and then impregnating the baked one with impregnating pitch, secondarily baking, repeating this several times if necessary, followed by subjecting to graphitizing treatment. The graphitizing treatment is a step in which thermal treatment is carried out at about 2500 to 3000° C.

Isotropic coke (amorphous coke) is desired particularly as a coke for a special carbon material among cokes for artificial graphite. This is because preventing anisotropy from appearing when carrying out cold isostatic press (CIP), mold pressing and extrusion pressing. Accordingly, a coke having a large thermal expansion coefficient is desired since if a coke has a small thermal expansion coefficient, the orientation is produced by pressure. Further, a carbon material is excellent in a heat resistance and therefore is used on a severe condition, for example, on a high temperature condition, so that a material having a high density and high strength is usually desired.

In general, a thermal expansion coefficient of artificial graphite is determined by a coke which is an aggregate. It is said that a thermal expansion coefficient of a coke is closely related to growth of a crystal structure of the coke. When a crystal structure of a coke grows to a large extent, a thermal expansion coefficient of the coke becomes smaller. Further, a density and strength of artificial graphite are determined as well by a coke which is an aggregate. A graphite structure is formed in a coke by graphitizing treatment, and irreversible shrinkage and expansion are brought about during the course thereof. A bulk density of artificial graphite and strength thereof closely related to the bulk density are determined by the degree of this shrinkage and expansion.

Known as a method of controlling a thermal expansion coefficient of a coke for a special carbon material is, as described in Japanese Patent Publication No. 60-3118/1985, a method of producing an amorphous coke by adding to coal tar pitch, a quinoline-insoluble accumulated substance by-produced when producing a needle coke from a coal tar base raw material. However, an ash in coal tar is contained in a quinoline-insoluble substance, and it is not preferred for a high purity carbon material prone to be damaged by metallic impurities.

Further, a method of producing an amorphous coke by adding carbonaceous fine powder such as carbon black to coal tar pitch is described in Japanese Patent Application Laid-Open No. 2-69308/1990. However, this method has the problem of a dispersibility of the carbonaceous fine powder in a coking step and the problem in that the shrinkage factor after graphitization is low. This requires to add a large amount of carbon black in a special carbon material whose product requires a high density and high strength and provides the problem in that the dispersibility is further deteriorated.

A treating method in which waste plastics (high molecular materials) are thermally decomposed together with heavy hydrocarbon oil by a coker is described in Japanese Patent Application Laid-Open No. 6-80970/1994 as an inexpensive treating method therefor, but it is not described therein to control a thermal expansion coefficient of an amorphous coke for a special carbon material.

Accordingly, it has been an important object to develop an amorphous coke as a raw material for a special carbon material of a high grade which can readily be controlled in a thermal expansion coefficient and does not contain metallic impurities and which shows a high shrinkage factor in graphitization.

In light of such existing situation, an object of the present invention is to provide an amorphous coke which can readily be controlled in a thermal expansion coefficient and whose molded article shows a high shrinkage factor in graphitization, thereby allowing the resulting graphitized product to have a high density and high strength and a production process for the same.

DISCLOSURE OF THE INVENTION

Intensive researches conducted by the present inventors in order to solve the problems described above have resulted in finding that a coke which can readily be controlled in a thermal expansion coefficient and which shows a high shrinkage factor in graphitization can be produced by blending a coal tar base heavy oil or a petroleum base heavy oil with at least one resin and subjecting the mixture to thermal decomposition polycondensation.

That is, the coke of the present invention is characterized in that it is an amorphous coke obtained by blending a coal tar base heavy oil and/or a petroleum base heavy oil with a thermoplastic resin and subjecting the mixture to thermal decomposition polycondensation, wherein it has a larger thermal expansion coefficient than that of a coke obtained from a coal tar base heavy oil alone and/or a petroleum base heavy oil alone blended with no thermoplastic resin and its molded article is shrunk by 0.3% or more in terms of a volume change rate before and after the treatment when it is subjected to graphitizing treatment.

Also, the production process for a coke according to the present invention is characterized in that in subjecting a coal tar base heavy oil or a petroleum base heavy oil used as a principal raw material to delayed coking treatment, the raw material is blended with at least one resin to modify the crystal structure of the coke, wherein the kind of the resin and a blending amount thereof are controlled so that a coke obtained by being subjected to thermal decomposition polycondensation has a larger thermal expansion coefficient than that of a coke obtained from the raw material blended with no resin.

In the production process of the present invention, a thermal expansion coefficient of the coke is controlled to such a degree that a molded article of the coke causes shrinkage at a volume change rate falling in a range of 0.3% or more, preferably 0.3 to 10.5% and more preferably 2.1 to 7.5% before and after graphitization. In this case, a blending proportion of the resin in the raw material in the production process of the present invention is preferably controlled in a range of 5 to 50% by weight.

The volume change rate described above is determined by the following method.

The above coke is crushed and then adjusted to a particle size (1.000 to 2.380 mm: 40%, 0.074 to 0.297 mm: 35%, 0.074 mm or less: 25%), and it is mixed with 30% (proportion to the whole mixture) of binder pitch at 160° C. for 20 minutes. This is mold-pressed to a size of 20 mm$\phi$×100 mm. The pressed test piece is baked up to 900° C. in a burning furnace and impregnated with impregnating pitch, and then it is secondarily baked again at 900° C. This test piece is heated up to 2500° C. at a heating speed of 10° C./min to be graphitized. Determined is a volume change rate of this test piece observed in turning from the secondary baked product to the graphitized product.

BEST MODE FOR CARRYING OUT THE INVENTION

The embodiments of the present invention shall be explained below.

First, a coal tar base heavy oil and/or a petroleum base heavy oil are used as the raw material used in the present invention. In this case, the coal tar base heavy oil includes high boiling tar oil and tar pitch, which are separated from coal tar produced by carbonizing coal, and it is preferably the tar pitch. The tar pitch includes soft pitch having a softening point of 70° C. or lower, intermediate pitch having a softening point of 70 to 85° C. and high pitch having a softening point of 85° C. or higher, and all can be used, but the soft pitch is advantageously used in terms of handling. It may be a mixture of two or three kinds of tar pitch, coal tar and high boiling tar oil.

In the present invention, quinoline-insoluble substances are not preferably substantially contained in the coal tar base heavy oil from the viewpoint of reducing metallic impurities in a coke to the utmost, but coal tar pitch containing less quinoline-insoluble substances can be used as it is.

The petroleum base heavy oil includes a decant oil (FCC-DO), which is a fluid catalytic cracking heavy component of petroleum, ethylene tar, which is a residue by-produced in thermal cracking of a light component such as petroleum naphtha at a temperature of 800° C. or lower to produce unsaturated hydrocarbons such as ethylene, and a vacuum residue of a low sulfur crude oil. Further, a light component may be removed in advance from these heavy oils by distillation in terms of a carbonization yield or they may be subjected to thermal treatment to turn to a heavier component by thermal polymerization.

Capable of being used as the resin used in the present invention is at least one selected from the group consisting of a polyethylene terephthalate resin, a polystyrene resin, a urethane resin, a polyethylene resin and a polypropylene resin. These resins may be waste plastics which were recovered and shall not be restricted.

In the present invention, a blending proportion of such resin to the coal tar base heavy oil and/or the petroleum base heavy oil can optionally be changed to thereby control a thermal expansion coefficient of the resulting coke so that the thermal expansion coefficient is larger than that of a coke produced without blending a resin.

A thermal expansion coefficient of the amorphous coke as a special carbon material is varied according to the use and the purpose thereof, and a blending proportion of the resin falls effectively in a range of 5 to 50% by weight in terms of a proportion of resin to the coal tar base heavy oil or the petroleum base heavy oil. It is more preferably 10 to 30% by weight. If a blending proportion of the resin is less than 5% by weight, it becomes impossible to control the thermal expansion coefficient, and if it exceeds 50% by weight, blending thereof to pitch becomes excessive to increase the viscosity, which results in bringing about troubles in the production. In the case of a polystyrene resin, it is quickly thermally decomposed and scarcely remains in the coke, and therefore it is blended preferably in a relatively large amount, particularly 20% by weight or more.

To refer to the mechanism of control from the viewpoint of a crystal structure of a coke, a method of controlling a coke crystal structure which exerts a large effect on the thermal expansion coefficient includes inhibition of coalescence of mesophase brought about by adsorption of quinoline-insoluble substances onto the mesophase, which is a coke precursor as shown in Japanese Patent Publication No. 60-3118/1985. In contrast with this, the present invention relates to inhibition of coalescence of a mesophase brought about by inhibition of mass transfer, which results from a rise in the viscosity in the reaction system caused by rapid reaction of chemical species contained in the raw material. The resin causes thermal decomposition at about 400° C. by co-carbonizing the coal tar base heavy oil or the petroleum base heavy oil and the resin by delayed coking treatment to generate a large amount of gases such as hydrogen, carbon dioxide, hydrocarbon and the resin monomer.

It is considered that this gas and a coking component remaining in the reaction system cause coking reaction rapidly with the raw material pitch, which is accompanied with thermal decomposition polycondensation. In this case, it is considered that the coking reaction rate can be controlled by optionally changing a blending proportion of the resin and that the crystal structure of the coke, in turn, a thermal expansion coefficient of the coke can be controlled. With respect to the shrinkage factor in graphitization, foreign matters such as quinoline-insoluble substances are adsorbed on a mesophase to inhibit coalescence in the method described in the official gazette described above. Compared to this, it is considered that foreign matters are not present in the coke crystal structure in the present invention, so that the crystal structure uniformly develops in graphitization and comes to show a high shrinkage factor.

In the production process of the present invention for obtaining an amorphous coke by thermal decomposition polycondensation, it can be produced by a batch system, but a treating method by continuously charging into a known delayed coking plant is desirable in terms of the cost. The delayed coking plant comprises, as publicly known, a delayed coker constituted from a heating furnace, a coke drum and a coker fractionator and a calciner apparatus such as a rotary kiln. In the treating method by continuously charging, the resin to be blended is crushed in advance into fine powder, and it may be charged in the form of a slurry prepared by mixing in a prescribed proportion with the coal tar base heavy oil or the petroleum base heavy oil, which is the raw material, or it may be charged in a liquefied form prepared by mixing with the coal tar pitch or the petroleum base heavy oil at a temperature of not lower than a melting point of the resin.

Such raw materials are subjected to thermal treatment in a range of about 400 to 550° C. in a heating furnace and then subjected to coking reaction by thermal decomposition polycondensation in a long time (20 to 40 hours) in a coking drum while continuously charged from the bottom of the coking drum, whereby a raw coke is produced and piled up. A cracked distillate is discharged from the column top of the coking drum in the form of a gas-liquid mixture and introduced into the coker fractionation to be separated into various distillates and fuel gas containing a lot of hydrogen and methane, and a part of the bottom oil is recycled to the heating furnace together with the raw materials.

The raw coke piled up in the coking drum is cut out by means of high pressure water and then subjected to calcination treatment at about 1200 to 1500° C. in a rotary kiln, whereby a coke is produced. The coke thus obtained has a higher thermal expansion coefficient than that of a coke obtained from the coal tar base heavy oil alone or the petroleum base heavy oil alone which is the primary component, and it is useful as an amorphous coke aggregate which provides a graphite molded article having a high density and high strength by causing shrinkage in a range of 0.3% or more, preferably 0.3 to 10.5% and more preferably 2.1 to 7.5% in terms of a volume change rate before and after graphitization of a molded article obtained by crushing the coke, adjusting the particle size thereof, then mixing with binder pitch and molding by cold isostatic pressing (CIP). In this case, if the shrinkage factor is 0.3% or less in terms of a volume change rate, the molded article is scarcely changed in a volume, and the graphitized article is reduced in a density to a large extent in combination with a reduction in the weight in graphitization which follows decomposition and gasification of hetero elements contained in the coke. Accordingly, it is not preferred. Further, if the shrinkage factor is 10.5% or more in terms of a volume change rate, rapid shrinkage brings about cracking and deformation, and therefore it is not preferred in terms of the yield and the strength.

EXAMPLES

The present invention shall more specifically be explained with reference to the following examples, but the present invention shall by no means be restricted by these examples.

Example 1

Coal tar pitch was blended with a polyethylene terephthalate resin in a proportion of 50:50 (% by weight), and then the resulting pitch-like substance was coked at 480° C. by means of a delayed coking test apparatus and calcined at 1330° C. for one and half hour. The calcined coke thus obtained was processed and adjusted in the following procedure to measure the coefficient of thermal expansion (CTE), the volume change rate in graphitization and the flexural strength.

Measurement of CTE:

The above coke is crushed and then adjusted to a particle size (0.250 to 1.000 mm: 20%, 0.074 to 0.250 mm: 45%, 0.074 mm or less: 35%), and it is mixed with binder pitch at 160° C. for 20 minutes. An addition amount of the binder pitch is selected so that the bulk density of the mixture in molding is maximized. This is extrusion-molded into a size of 20 mm$\phi$×100 mm. After molding, the molded article is baked at 900° C. and then graphitized at 2500° C. to prepare a sample for measuring CTE. In measurement of CTE, an average thermal expansion coefficient at room temperature to 500° C. is measured.

The measurement results thereof are shown in Table 1.

Measurement of Volume Change Rate and Flexural Strength:

The above coke is crushed and then adjusted to a particle size (1.000 to 2.380 mm: 40%, 0.074 to 0.297 mm: 35%, 0.074 mm or less: 25%), and it is mixed with 30% (proportion to the whole mixture) of binder pitch at 160° C. for 20 minutes. This is mold-pressed to a size of 20 mm$\phi$×100 mm. The molded test piece is baked up to 900° C. in a burning furnace and impregnated with impregnating pitch, and then it is secondarily baked again at 900° C. This test piece is heated up to 2500° C. at a heating rate of 10° C./min to be graphitized. Measured is a volume change rate of this test piece observed in turning from the secondary baked product to the graphitized product. Further, after measuring a bulk density of the graphitized test piece, with a distance between supporting points being set to 80 mm, a load is applied vertically onto the middle of the horizontal test piece at an even speed of 5±2 kg per second to calculate the flexural strength from the maximum load observed when the test piece is destroyed using the following equation:

$$B=8Pl/\pi d^3$$

(B: flexural strength, P: maximum load, l: distance between supporting points, d: diameter of the test piece)

The respective results are shown in Table 1.

Example 2

The coal tar pitch was blended with the polyethylene terephthalate resin in a proportion of 70:30 (% by weight), and then the resulting pitch-like substance was processed and measured under the same conditions as in Example 1.

The results thereof are shown in Table 1.

Example 3

The coal tar pitch was blended with the polyethylene terephthalate resin in a proportion of 95:5 (% by weight), and then the resulting pitch-like substance was processed and measured on the same conditions as in Example 1. The results thereof are shown in Table 1.

Example 4

The coal tar pitch was blended with a urethane resin in a proportion of 50:50 (% by weight), and then the resulting pitch-like substance was processed and measured under the same conditions as in Example 1.

The results thereof are shown in Table 1.

Example 5

The coal tar pitch was blended with the urethane resin in a proportion of 70:30 (% by weight), and then the resulting pitch-like substance was processed and measured under the same conditions as in Example 1.

The results thereof are shown in Table 1.

Example 6

The coal tar pitch was blended with the urethane resin in a proportion of 95:5 (% by weight), and then the resulting pitch-like substance was processed and measured under the same conditions as in Example 1.

The results thereof are shown in Table 1.

Example 7

The coal tar pitch was blended with a mixed resin of polyethylene and polypropylene in a proportion of 50:50 (% by weight), and then the resulting pitch-like substance was processed and measured under the same conditions as in Example 1.

The results thereof are shown in Table 1.

Example 8

The coal tar pitch was blended with the mixed resin of polyethylene and polypropylene in a proportion of 70:30 (% by weight), and then the resulting pitch-like substance was processed and measured under the same conditions as in Example 1.

The results thereof are shown in Table 1.

Example 9

The coal tar pitch was blended with the mixed resin of polyethylene and polypropylene in a proportion of 95:5 (% by weight), and then the resulting pitch-like substance was processed and measured under the same conditions as in Example 1.

The results thereof are shown in Table 1.

Comparative Example 1

The coal tar pitch alone was processed and measured under the same conditions as in Example 1.

The results thereof are shown in Table 1.

Example 10

A decant oil (FCC-DO), which was a fluid catalytic cracking heavy component of petroleum was blended with a urethane resin in a proportion of 50:50 (% by weight), and then the resulting pitch-like substance was processed and measured under the same conditions as in Example 1.

The results thereof are shown in Table 1.

Comparative Example 2

The decant oil (FCC-DO) alone, which was a fluid catalytic cracking heavy component of petroleum was processed and measured under the same conditions as in Example 1.

The results thereof are shown in Table 1.

TABLE 1

|  | Example | | | | | |
| --- | --- | --- | --- | --- | --- | --- |
|  | 1 | 2 | 3 | 4 | 5 | 6 |
| Thermal expansion coefficient ($10^{-6}/°$ C.) | 5.60 | 4.32 | 3.10 | 5.48 | 4.26 | 3.03 |
| Volume change rate* (%) | −6.5 | −4.4 | −2.9 | −5.6 | −3.8 | −2.6 |
| Graphite bulk density (g/cm$^3$) | 1.73 | 1.69 | 1.66 | 1.71 | 1.68 | 1.66 |
| Flexural strength (kg/cm$^2$) | 337 | 312 | 295 | 327 | 306 | 292 |

|  | Example | | | Com. Ex. | Ex. | Com. Ex. |
| --- | --- | --- | --- | --- | --- | --- |
|  | 7 | 8 | 9 | 1 | 10 | 2 |
| Thermal expansion coefficient ($10^{-6}/°$ C.) | 4.62 | 3.83 | 3.02 | 2.87 | 4.53 | 1.52 |
| Volume change rate* (%) | −5.0 | −3.5 | −2.3 | +1.2 | −9.1 | +1.8 |
| Graphite bulk density (g/cm$^3$) | 1.70 | 1.67 | 1.65 | 1.57 | 1.77 | 1.56 |
| Flexural strength (kg/cm$^2$) | 320 | 302 | 287 | 249 | 356 | 210 |

Com. Ex. = Comparative Example
Ex. = Example
*+ shows volume expansion, and − shows volume shrinkage As apparent from Table 1 described above, a thermal expansion coefficient of the coke, which was produced by subjecting a pitch-like substance as a raw material obtained by adding a prescribed amount of a PET resin and the like to coal tar pitch, to delayed coking treatment was made to become larger than that of a coke obtained from the coal tar pitch alone, and when the former coke was used as an aggregate to carry out graphitizing treatment, volume shrinkage was caused in a prescribed range, whereby a graphite molded article having a high density and high strength could be obtained (Examples 1 to 9 vs. Comparative Example 1).

Further, the petroleum base raw material prepared by adding a prescribed amount of the PET resin to the decant oil was subjected to delayed coking treatment to be coked, whereby a thermal expansion coefficient of the coke was made to become larger than that of a coke obtained from the decant oil alone, and when the former coke was used as an aggregate to carry out graphitizing treatment, volume shrinkage was caused in a prescribed range, whereby a graphite molded article having a high density and high strength could be obtained (Example 10 vs. Comparative Example 2).

INDUSTRIAL APPLICABILITY

According to the present invention, an amorphous coke which has a larger thermal expansion coefficient than that of a coke obtained from a coal tar base heavy oil alone or a petroleum base heavy oil alone and which provides a graphite molded article having a high density and high strength by subjecting a molded article to graphitizing treatment, wherein the molded article is obtained by crushing the amorphous coke, adjusting a particle size thereof, then mixing it with binder pitch and molding the mixture, is obtained by subjecting as a raw material a pitch-like substance obtained by adding a prescribed amount of a resin to a coal tar base heavy oil or a petroleum base heavy oil, to delayed coking treatment to coke. It is suitably used for an aggregate for an artificial graphite electrode, an aggregate for a special carbon material and a recarburizer.

What is claimed is:

1. A production process of an amorphous coke for a special carbon material characterized in that in subjecting a heavy oil comprising at least one selected from the group consisting of high boiling tar oil, tar pitch, decant oil, ethylene tar and a vacuum residue of a low sulfur crude oil used as a principal raw material to thermal decomposition polycondensation, the raw material is blended with at least one resin selected from the group consisting of a polyethylene terephthalate resin, a polystyrene resin, a urethane resin, a polyethylene resin and a polypropylene resin in a blending proportion falling in a range of 5 to 50 percent by weight to modify a coke crystal structure, and the thermal decomposition polycondensation is carried out by delayed coking treatment in which the raw material mixed with the at least one resin is subjected to thermal treatment in a range of 400 to 550° C. and then to coking reaction to produce a raw coke and in which the raw coke is subjected to calcination treatment at 1200 to 1500° C., wherein the kind of the resin and a blending amount thereof are controlled so that the resulting coke has a larger thermal expansion coefficient than that of a coke obtained from the raw material blended with no resin.

* * * * *